(12) United States Patent
Sene (10) Patent No.: US 9,045,021 B2
(45) Date of Patent: Jun. 2, 2015

(54) RETRACTABLE SUN SHADE FOR AN AUTOMOBILE

(71) Applicant: Mandoye Sene, East Orange, NJ (US)

(72) Inventor: Mandoye Sene, East Orange, NJ (US)

( * ) Notice: Subject to any disclaimer, the term of this patent is extended or adjusted under 35 U.S.C. 154(b) by 0 days.

(21) Appl. No.: 14/027,524

(22) Filed: Sep. 16, 2013

(65) Prior Publication Data

US 2015/0075735 A1   Mar. 19, 2015

(51) Int. Cl.
*B60J 3/02* (2006.01)
*B60J 7/20* (2006.01)
*B60J 3/00* (2006.01)

(52) U.S. Cl.
CPC ........................................ *B60J 3/002* (2013.01)

(58) Field of Classification Search
CPC ........ B60J 1/2019; B60J 1/2055; B60J 11/00; B60J 1/2077; B60J 11/02; B60J 11/025; B60J 1/2025; B60J 1/2027; B60J 1/2044; B60J 1/205; B60J 1/2069; B60J 1/208; B60J 1/2091; B60J 3/02; B60J 3/0208
USPC ................ 296/95.1, 136.12, 97.2, 97.6, 97.9, 296/97.1, 97.4, 136.03, 136.04
See application file for complete search history.

(56) References Cited

U.S. PATENT DOCUMENTS

| | | | |
|---|---|---|---|
| 5,085,473 A * | 2/1992 | Yang | 296/141 |
| 5,186,511 A * | 2/1993 | Hwang | 296/95.1 |
| 5,468,040 A | 11/1995 | Peng Hsieh et al. | |
| 5,638,884 A | 6/1997 | Lin | |
| 6,032,718 A | 3/2000 | Chen | |
| 6,513,858 B1 * | 2/2003 | Li et al. | 296/98 |
| 6,536,829 B2 | 3/2003 | Schlecht et al. | |
| 7,137,661 B2 | 11/2006 | Neuer et al. | |
| 7,140,662 B1 | 11/2006 | Wilkinson et al. | |
| 7,252,321 B2 | 8/2007 | Lee et al. | |
| 7,562,928 B1 * | 7/2009 | Morazan | 296/136.01 |
| D625,673 S | 10/2010 | Rodriguez | |
| 7,854,464 B2 * | 12/2010 | Mori | 296/97.4 |
| 8,167,356 B1 | 5/2012 | Morazan | |
| 2004/0119313 A1 * | 6/2004 | Naik | 296/97.2 |
| 2006/0113818 A1 | 6/2006 | Ferguson | |

\* cited by examiner

*Primary Examiner* — Glenn Dayoan
*Assistant Examiner* — Sunsurraye Westbrook
(74) *Attorney, Agent, or Firm* — Michael J. Feigin, Esq.; Feigin & Associates, LLC (57) ABSTRACT

A sun shade and/or system of shades is used for preventing sunlight from shining into an interior of the automobile. Such a device or system is mountable to an automobile having a front end with a windshield, a right side, and a left side. The sun shade is generally formed of three members. An elongated front member has a flexible front panel, and is adapted for placement at a top of the windshield. Right and left members are placed at the right and left sides, respectively, of the automobile. The front panel is extendable out of and retractable into the front member. Side panels are extendable out of and retractable into the side members. The panels may be extended and retracted automatically using a remote or manually by hand.

20 Claims, 5 Drawing Sheets

RETRACTABLE SUN SHADE FOR AN AUTOMOBILE

FIELD OF THE DISCLOSED TECHNOLOGY

The disclosed technology relates generally to after market parts for automobiles and, more specifically, to a retractable sun shade to be retrofitted to an automobile.

BACKGROUND OF THE DISCLOSED TECHNOLOGY

Sun shades for automobiles are known in the art. For example, a commonly used product is a foldable sunshade that is placed against a windshield on the interior of a car. The sun shade is supposed to keep the interior of the interior of the car protected from sunlight. Thus, the sun shade may be used to protect the portions of the dashboard that are exposed to direct sunlight and/or to keep the car cool during hot weather.

Some sun shades of the prior art use suction cups to stick to the interior surface of the windshield. Others use straps or ties which attach to the rear view mirror or some other portion on the interior of the automobile. Before exiting an automobile, a user must press each and every suction cup firmly against the windshield or secure every strap such that the sun shade is properly in place.

The drawbacks to such sun shades are numerous. Firstly, the sun shades of the prior art are often difficult to apply, requiring a user to tediously ensure that the suction cups are properly stuck or the straps properly applied. Furthermore, the sun shades may not completely abut the entire surface of the windshield, thereby leaving gaps which are at the mercy of the sun's rays. Temperature and other conditions may cause suction cups and/or adhesives to become unstuck and unusable.

Therefore, there is a need in the art to provide the protection of a properly installed sun shade, with the convenience of automated or semi-automated operation.

SUMMARY OF THE DISCLOSED TECHNOLOGY

Therefore, it is an object of the disclosed technology to find a functional, semi-permanent sun shade that does not require a great deal of effort to apply.

As such, in an embodiment of the disclosed technology, a sun shade or system of shades is used for preventing sunlight from shining into an interior of the automobile. Such a device or system is mountable to an automobile having a front end with a windshield, a right side, and a left side.

The sun shade is generally formed of three members. An elongated front member has a flexible front panel, and is adapted for placement at a top of the windshield. "At a top of the windshield", for purposes of this specification, is sufficiently close to the top edge of the windshield such that the flexible front panel can cover at least a portion of the windshield. The front member has a right end and a left end corresponding to the right side and the left side, respectively, of the automobile.

Elongated right and left members are adapted for placement at the right and left sides, respectively, of the automobile. Each of the right and left members are defined by proximal and distal ends. The proximal ends are affixed to the ends of the front member. The juncture between the right and left members and the front member is substantially perpendicular. "Substantially perpendicular", for purposes of this specification, is defined as being within 5° of forming a 90°, right angle.

A flexible front panel has two configurations or arrangements. The first configuration involves the front panel being condensed into the front member. That is, in the first configuration, the front panel is not exposed, and the windshield is uncovered. In the second configuration, the front panel is extended to cover at least a portion of the windshield. In further embodiments, left and right side panels are extendable from the right and left members, respectively, to cover at least a portion of the side windows of the automobile.

In a further embodiment, the front panel and/or the side panels are automatically extendable from their respective members using a remote. In still a further embodiment, the panels are manually extendable from their respective members. The front panel may be partitioned into a separate driver side panel and passenger side panel, each of which are retractable to cover a driver side portion and a passenger side portion, respectively, of the windshield. A pulley and cord may also be used to manually or automatically extend and/or retract the panels.

The sun shade may be fashioned to give an appearance of sunglasses being worn by the automobile. More specifically, the front panel is shaped and colored to give an appearance of lenses of a pair of sunglasses. Further, the members are decorated to collectively give an appearance of frames of sunglasses.

In further embodiments, the right member and the left member are mountable to a right window channel and a left window channel, respectively, of the automobile. The right and left members fit into the window channels such that they are detachably secured to the automobile. That is, the right and left member, and therefore the front member, may easily be removed from the automobile. In an alternative embodiment, the sun shade is anchored to the interior of the automobile. That is, the side members may have one or more straps for securing the sun shade through the interior of the automobile.

In a further embodiment, the sun shade may have a temperature sensor. The temperature sensor is operable to detect the temperature inside and/or outside of the vehicle. The temperature sensor may cause the panels to toggle between the two configurations of the flexible front panel. Thus, when a certain elevated temperature is detected, the flexible front panel is toggled to the second configuration whereby the front panel is extended to cover at least a portion of the windshield.

In a method of the disclosed technology, the sun shade is used on the automobile, not necessarily in the following order, by: a) mounting the sun shade to the automobile such that the front member is placed at a top portion of the windshield, and the right and left members are placed along the right and left sides, respectively, of the automobile, b) extending the front panel from the front member to cover said windshield, and c) retracting the front panel into said front member to uncover said windshield.

In another embodiment of the disclosed technology, a system of shades is used on an automobile. The system has a front shade with an extendable and retractable front panel. The front member is mountable to a front portion of an automobile such that the front panel is extendable to cover at least a portion of a windshield of the automobile. The system also has a right shade having an extendable and retractable right panel. The right member is mountable to a passenger side of the automobile such that it is extendable to cover at least a portion of at least one passenger side window of the automobile. The system further has a left shade with an extendable and retractable left panel. The left member is mountable to a driver side of the automobile such that the left panel is extendable to cover at least a portion of at least one driver side window of the automobile.

In further embodiments of the disclosed system, a wireless remote is used for toggling extension and retraction of the panels. In an alternative embodiment, the shades are extended and retracted manually by a user. In still a further embodiment, the right shade and the left shade each have a lip adapted to be received into a window channel of a window of the automobile. The lips may further have an adhesive for securing the lips into said window channels of said automobile.

In yet another embodiment of the disclosed technology, a sun shade is used on an automobile. The sun shade is generally a U-shaped frame formed of a front member and two side members. The front member is adapted for placement at a juncture of a windshield and a roof of the automobile. The sun shade also has two substantially similar panels retractably hanging from the front member such that the panels cover portions of the windshield. The frame and panels are configured such that they collectively give the impression of sunglasses adapted to be donned by the automobile. The panels being representative of lenses used for preventing sunlight from entering the windshield, and the frame being representative of the frames of sunglasses. As such, the frames and/or panels may be decorated to more closely resemble sunglasses.

In further embodiments of the disclosed sun shade, the panels may have two configurations. In a first configuration the panels are compacted into the front member. "Compacted" is defined as, for purposes of this specification, the panel being spooled onto a rotatable tube, collapsed in an accordion-like manner, or otherwise bunched or condensed to fit inside or directly under the front member of the sun shade. In the second configuration, the panels hang from the front member, under the force of gravity, to cover at least a portion of the windshield. That is, the panels are partially or substantially spread out such that they rest upon or abut the outer surface of the windshield. The orientation of the panels is contingent on the angle of the windshield on the automobile on which the sun shade is used. Thus, on an automobile with a substantially vertical windshield, the panels may not abut the surface of the windshield at all, and may simply hang from the front member.

In further embodiments of the sun shade, a pulley may be disposed in the front member, and a cord may be in translational communication with the pulley and the panels such that rotation of said pulley toggles between the two configurations of panels. In an alternative embodiment of the sun shade, the panels are affixed to a rotatable tube in the front member. Rotation of the tube causes the panels to be spooled or rolled around the tube thereby toggling the state of the panels from the first configuration to the second configuration.

It should be understood that the use of "and/or" is defined inclusively such that the term "a and/or b" should be read to include the sets: "a and b," "a or b," "a," "b."

Further features of the device, described above, are also applicable to a method of use.

DETAILED DESCRIPTION OF EMBODIMENTS OF THE DISCLOSED TECHNOLOGY

In an embodiment of the disclosed technology, a sun shade is used on an automobile (hereinafter interchangeably referred to as "automobile," "car" or "vehicle") for veiling a windshield and/or side windows of the automobile from sunlight. Such a sun shade may be permanently or semi-permanently retrofitted to an automobile. "Semi-permanent" installation, for purposes of this specification, is defined as mounting the sun shade to fixed portions of a door's window channel on the sides of the automobile such that no drilling, bonding and/or screwing is required. Thus, "permanent" installation would be defined as affixing the sun shade to the body and/or windows of the automobile using screws, holes and/or bonding.

The sun shade may generally have three members; a front member and two side members. The three members may be configured to form three sides of a rectangle. That is, the side portions are affixed perpendicularly to the front portion thereby forming a right angle a juncture thereof. Each of the portions contains a retractable shade panel, the panel operable to be retractably lowered and raised to cover and uncover the windshield and/or the side windows of the automobile. Thus, the panels have two configurations.

The first configuration is characterized by the panels being in a compacted or retracted position. In the first configuration, the panels are completely or partially hidden from view. That is, the panels are compacted into the members for storage during which time the automobile may be driven. The second configuration is characterized by the panels being extended to cover at least a part of the windshield and/or the side windows of the automobile. In this configuration, the panels have been lowered, either manually or automatically, to shade the windows of the automobile. The panels may be toggled back and forth between the two configurations.

Embodiments of the disclosed technology will become clearer in view of the following detailed description of the drawings.

Figure 1:
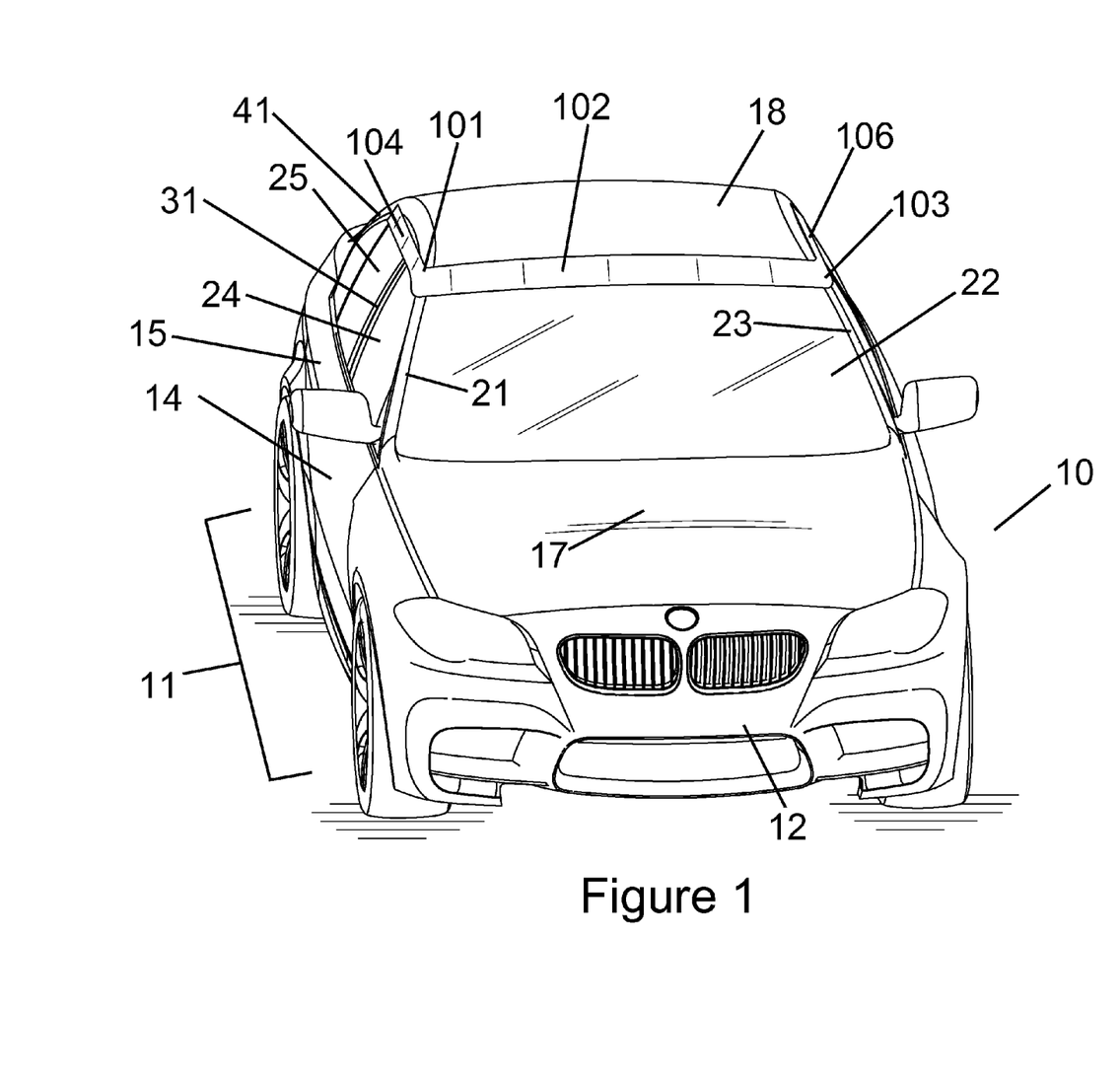
FIG. 1 shows a front perspective view of an automobile equipped with a sun shade of an embodiment of the disclosed technology.
Figure 2:
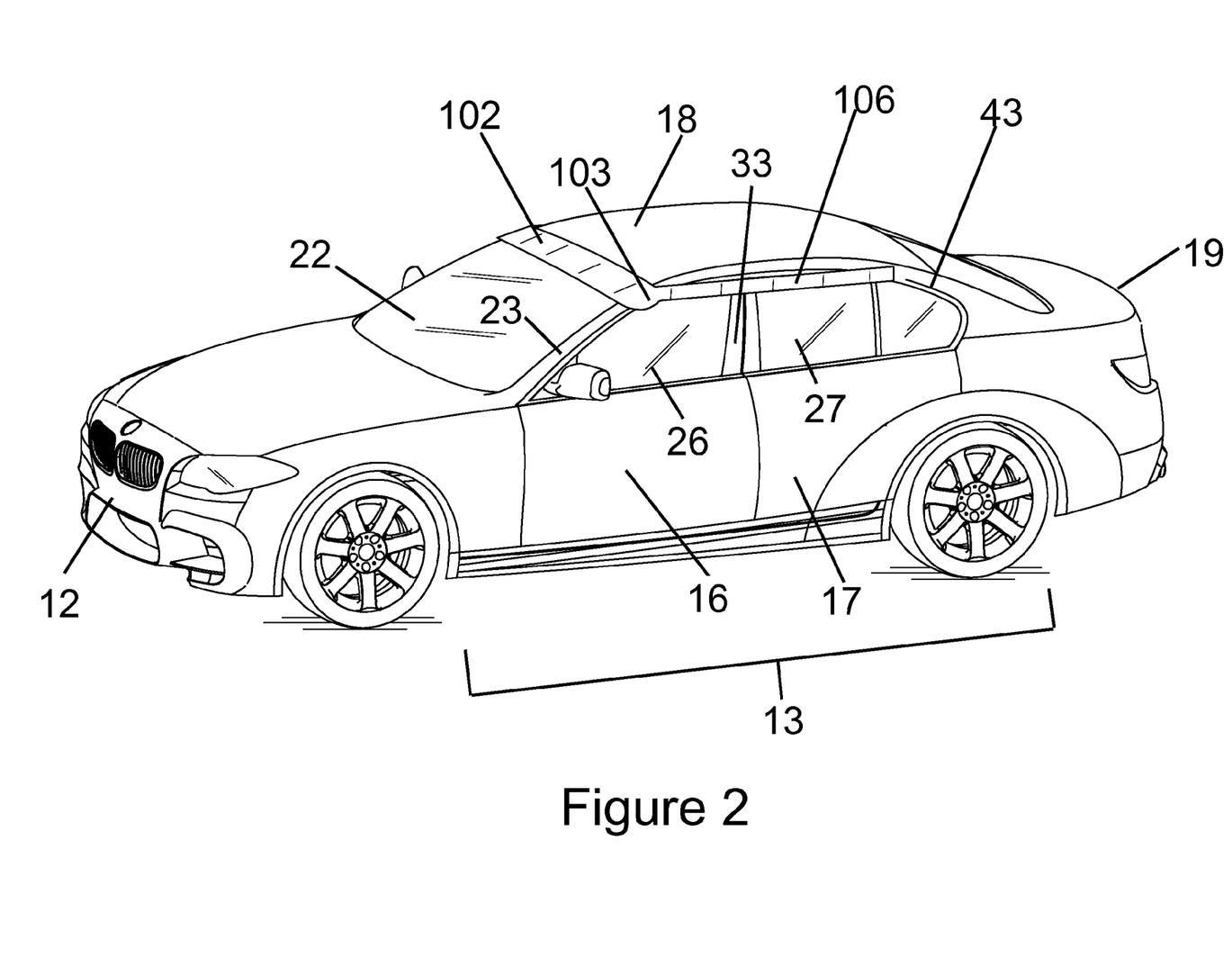
FIG. 2 shows a side perspective view of the automobile equipped with the sun shade of FIG. 1.

FIG. 1 and FIG. 2 show a front perspective view and a side perspective view, respectively, of an automobile equipped with a sun shade of an embodiment of the disclosed technology. A sun shade 100 is shown for use on a automobile 10. An "automobile", for purposes of the specification, is defined as any propelled, wheeled vehicle having an engine or motor for transporting passengers and/or cargo.

The automobile 10 is generally defined by a front end 12, a rear end 13, a right side 11, a left side 13, and/or a roof 18. The front end 12 of the automobile 10 has a glass windshield 22 or front window (herein "windshield 22") for protecting passengers from wind and/or debris, and a hood 17. The right side 11 of the automobile 10 generally has a a passenger door 14 having a passenger side window 24. The right side 11 may also have a right rear door 15 having a right rear window 25. Likewise, the left side 13 has a driver side door 16 with a driver side window 26, and left rear door 17 with a left rear window 27.

A right A-pillar 21 and a left A-pillar 23 define a juncture between the windshield 22 and the passenger side window 24 and the driver side window 26, respectively. A "pillar" is defined as the vertical or near vertical supports of an automobiles window area. An "A-pillar" is the forward-most pillar on an automobile. B-pillars 31, 33 define the vertical supports found at the juncture between the front side windows 24, 26 and the rear windows 25, 27. C-pillars 41, 43 are those vertical or near-vertical supports found at the back side of the rear windows 25, 27.

Referring still to FIGS. 1 and 2, the sun shade 100, as described partially above, generally has an elongated front member 102, and two elongated side members 104, 106. Each side member 104, 106 is affixed to the front member 102 at a juncture 101, 103 forming a substantially perpendicular junction. That is, the angle formed at the junction is 90° with a tolerance of ±5°. The front member 102 is mounted to the front end 12 of the automobile 10. More specifically, the front member 102 is mounted at or near the juncture of the windshield 22 and the roof 18, and runs along the entire width of the windshield 22. The right juncture 101 between the front member 102 and the right side member 104 occurs generally at or near the right A-pillar 21 of the automobile 10. Similarly, the left juncture 103 occurs generally at or near the left A-pillar 23.

The junctures 101, 103 are fixed such that the sun shade 100 forms a rigid or semi-rigid frame. Alternatively, the members 102, 104, 106 may be separate and distinct from one another such that each member may be installed individually in different configurations. For example, a user may desire to install just the front member 106 to protect the windshield 22. Thus, when referred to individually, the members may be considered shades such that, when not affixed to one another, the members taken individually act as shades to whichever window of the automobile 10 they are mounted on or near.

Figure 3:
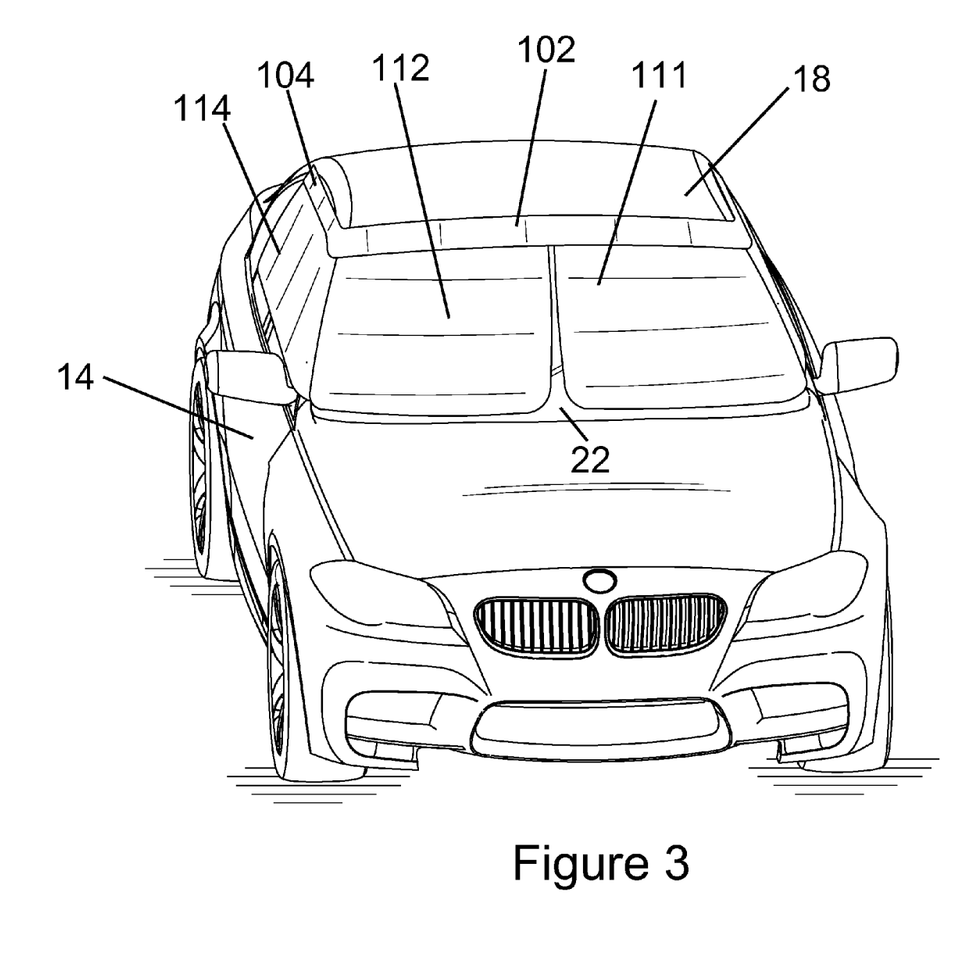
FIG. 3 shows the view of FIG. 1 with the sun shade in a retracted position.

FIG. 3 shows the view of FIG. 1 with the sun shade in a retracted position. For purposes of this specification, the position shown in FIGS. 3 and 4 may be referred to as the "second configuration", wherein the "first configuration" is the compacted position shown in FIGS. 1 and 2. Retractable panels 112 and 122 are shown extending from the front member 102. The first panel 101 covers the driver side portion of the windshield 22. That is, the first panel 111 covers the left portion of the windshield through which the driver would see the road ahead while operating the automobile. The second panel 112 covers the passenger side portion of the windshield 22, which is the right side of the windshield. Thus, panels 111, 112, when not in use, are retracted into or under the front member 102 as shown in FIGS. 1 and 2. Panels 111, 112, when retracted, prevent sunlight from entering the cabin of the automobile 10 through the windshield 22. Moreover, panels 111, 112 protect interior portions of the automobile 10, such as the dashboard, from sun damage.

Figure 4:
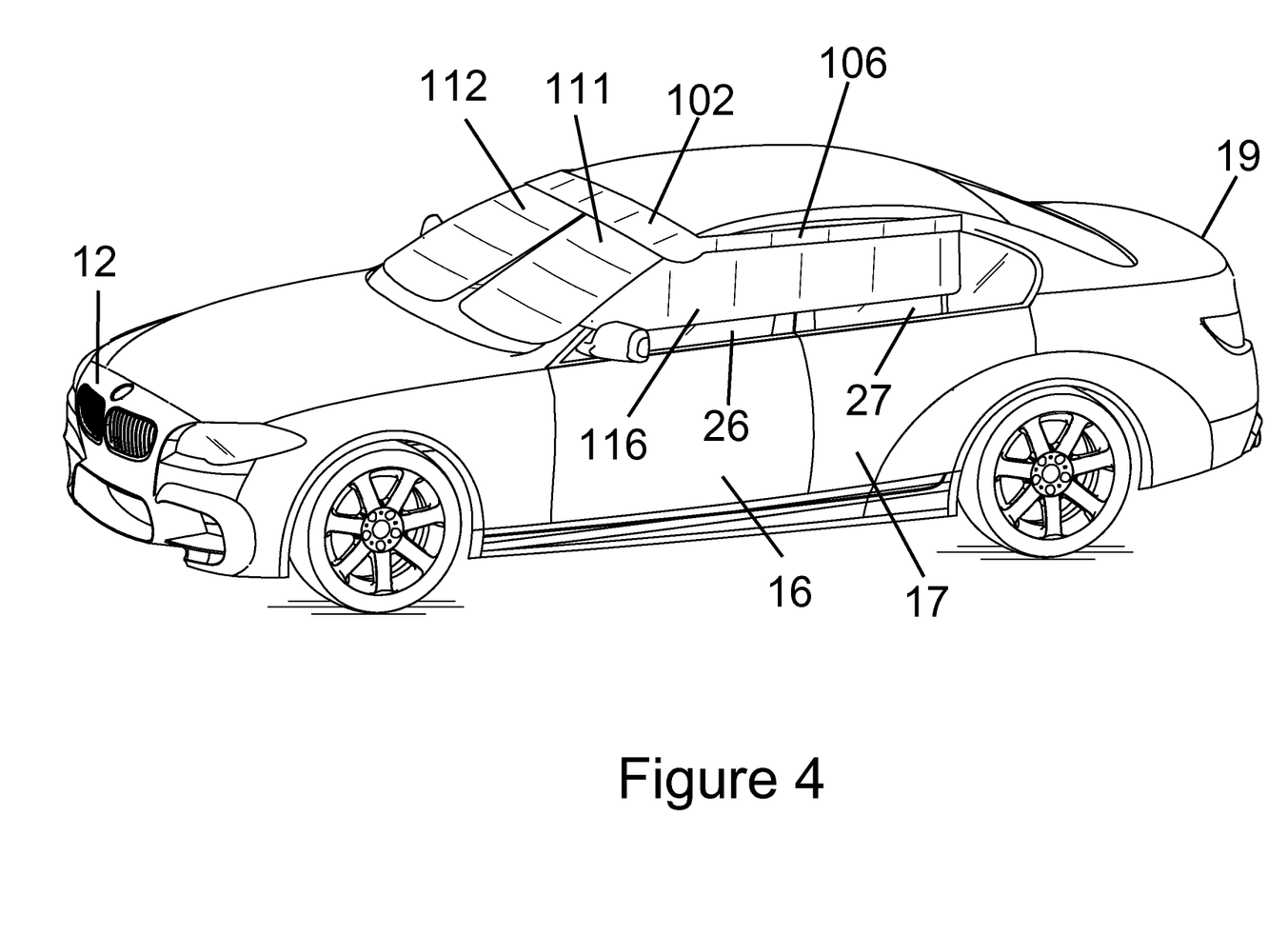
FIG. 4 shows the view of FIG. 2 with the sun shade in a retracted position.

FIG. 4 shows the view of FIG. 2 with the sun shade in a retracted position. A left side panel 116 extends from the left member 106 to cover the driver side window 26 and the left rear window 27. A similar configuration exists on the right side 14 of the automobile 10 not visible in FIG. 4. Thus, a right side panel 114 would extend from the right member 104 to cover the passenger side window 24 and the right rear window 25. Side panels 114, 116, when extended, prevent sunlight from entering the cabin through the side windows of the automobile 10. The left side panel 116, when not in use, is retracted into or under the left member 106. Likewise, the right side panel 114, when not in use, is retracted into or under the right member 104.

When desired to be used, the front panels 111, 112 and the side panels 114, 116 (hereinafter collectively referred to as "the panels") may be retracted manually and/or automatically. In an automated configuration, a remote (not shown), such as a key fob with one or more buttons, may be used to cause the panels to retract into their respective members. The panels may be raised and lowered using one or more pulleys in the members with cords mounted thereon. The cords being disposed throughout the panels such that rotation of the pulley(s) causes the panels to be extended and/or retracted.

One or more motors may be coupled to pulleys in order to automate the rotation of the pulleys. Alternatively, the pulleys may be powered by the battery and/or alternator of the automobile 10. Thus, when a user exits the automobile 10 and desires to protect the interior from sunlight, the user may press a button on the remote to cause the panels to extend and cover the windows. The extending of the panels may be synchronized to a remote locking mechanism of the automobile 10 such that when a user presses the remote to lock the doors, the panels are triggered to be extended as well.

Upon returning to the automobile 10, the user may press a button on the remote to cause the panels to retract so the automobile can be driven. In further embodiments of the disclosed technology, the panels may be partially extended while the vehicle is in use in order to block sunlight from obstructing a driver's and/or a passenger's vision. This embodiment would be subject to safety constraints as well as mechanical constraints due to the need to secure the panels such that wind does not cause displacement of the panels from the windows.

In another embodiment of the disclosed technology, the panels may be manually extended and/or retracted in their respective members. In the manual configuration, pulleys and cords may also be used to raise and lower the panels by way of pulling on a cord. The mechanism employed would be similar to that of a window shade. Because a cord may not be suitable for outdoor use on a moving vehicle, knobs or levers may be used to raise or lower the panels. The knobs may be mounted on or near the members in a position accessible by a user. The whole mechanical system may be weather-proof and/or stored completely in the interior of the member for protection from the elements and rust.

In further embodiments, the side panels 114, 116 may be extended and retracted horizontally in a similar nature to that of a horizontal window blind. The side panels 114, 116 may be slidingly engaged to a track disposed within the corresponding side members 104, 106 such that the panels may be applied and removed horizontally. For example, the side panels 114, 116 may be extended from and retracted to a storage position at or near the A-pillars 21, 23 of the automobile 10. A housing or strap may be mounted to the A-pillars 21, 23 for securing the side panels 114, 116 when not in use. Alternatively, the side panels 114, 116 may be extended from and retracted to a storage position at or near the C-pillars 41, 43 of the automobile 10. In the horizontally slid arrangement of the side panels 114, 116, the movement of the side panels 114, 116 may also be controlled automatically using a remote and/or manually by hand.

In still another embodiment, the sun shade may have a temperature sensor. The temperature sensor is operable to detect the temperature inside and/or outside of the vehicle. The temperature sensor may cause the panels to toggle between the two configurations of the flexible front panel(s) 111, 112 and/or the flexible side panels 114, 116. Thus, when a certain elevated temperature is detected, the panels are toggled to the retracted or second configuration. Thus, for example, the panels may be extended upon detection of a temperature greater than 85° F. Furthermore, the sun shade may be compacted into the first position upon the temperature dropping below a certain threshold, such as, for example 85° F. The temperature sensor may be disposed inside or outside of the vehicle. When the temperature sensor is disposed on the interior, the panels may be extended to prevent the interior from becoming uncomfortably hot. This automated temperature-based configuration may be restricted to occurring only when the engine of the vehicle is on for safety reasons.

Figure 5:
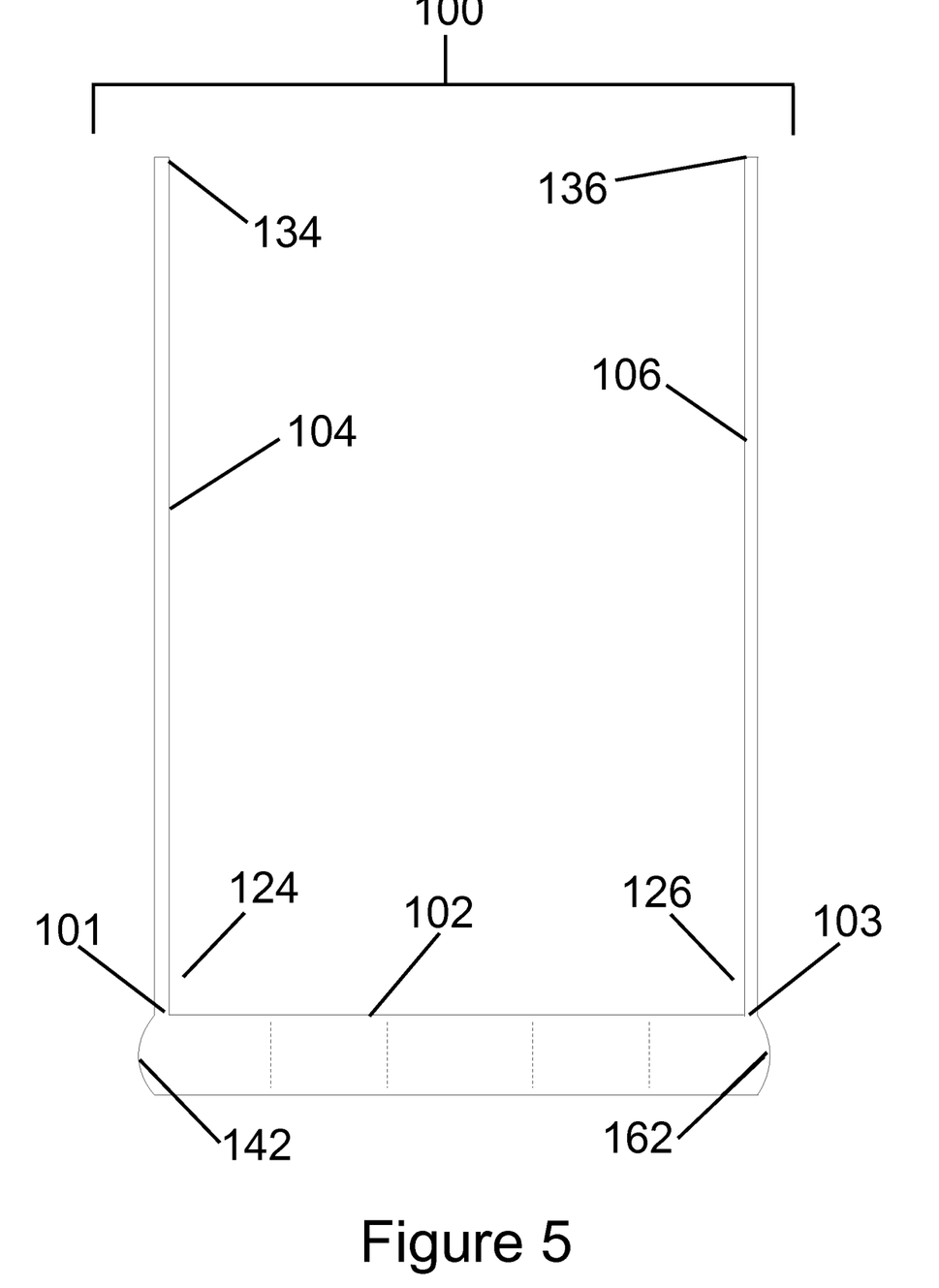
FIG. 5 shows a top plan view of a sun shade of an embodiment of the disclosed technology.

FIG. 5 shows a top plan view of a sun shade of an embodiment of the disclosed technology. As described partially above, the sun shade 100 has an elongated front member 102, a right side member 104, and a left side member 106, connected to form a generally U-shaped frame. The front member 102 is defined by a right end 142 and a left end 162. The right side member 104 is defined by a front end 124 and a rear end 134. The rear end 134 corresponds to the rear end 19 of the automobile 10. The front end 124 is affixed to the right end 142 of the front panel at a right juncture 101. The left side member 106 is defined by a front end 126 and a rear end 136, and is symmetrical to the right side member 104. The front end 126 of the right side member 106 is affixed to the left end 162 of the front member 102 at a left juncture 103. The junctures 101, 103 may be rigid such that the three members 102, 104, 106 form a unitary, rigid frame.

The sun shade 100 may be used on any type of vehicle, ranging from cars to trucks. The sun shade 100 need not be manufactured for a specific make and/or model of a vehicles. It may be adaptable to fit multiple types of automobiles.

In embodiments of the disclosed technology, the sun shade 100 may be mounted to the automobile 10 permanently using screws, nuts & bolts, and/or adhesives. In other embodiments, the sun shade 100 may be semi-permanently attached to the automobile 10. That is, the sun shade 100 may be removed from the automobile 10 without leaving any holes, scratches, or adhesive residue.

In one embodiment, the right member 104 and the left member 106 each have lips. The lips are shaped to be snuggly fit into window or glass run channels of the automobile 10. "Window channels" are defined as the rubber or plastic groove that is found around car windows. The window channel is typically used to provide a fluid-tight seal for the window. In order to install the sun shade using the window channels, the windows must first be rolled down in order to give access to the window channel. Thus, the lips of the right and left member 104, 106 are pushed upwards into the window channel such that the lips are secured firmly to the window frame. The lips may be lined with adhesive to further secure the sun shade. Window channels on either or both side windows 24, 25, 26, 27 may be used for installing the sun shade 100. This installation method makes no permanent modifications to the automobile 10 in that the sun shade 100 is easily removed by firmly pulling the lips out of the window channels.

In another semi-permanent application, the right and left members 104, 106 have one or more straps affixed to portions thereof. The straps are arranged such that the sun shade 100 is secured around the roof 18 of the automobile 10. Prior to installation, the doors 14-17 are opened. The straps extending from the right member 104 are then connected to corresponding opposing straps extending from the left member 106. The opposing straps are secured both on top of the roof 18 and below the roof 18 such that the straps and the sun shade 100 hug the roof 18 of the automobile 10. The members may have buffers (not shown) to abut portions of the automobile 10 such that the sun shade 100 does not damage or scratch the exterior of the automobile. The buffers may be made of rubber, foam, felt, or any other soft material.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A sun shade mountable to an automobile, the automobile having a front end with a windshield, a right side, and a left side, the sun shade comprising:
   an elongated front member shaped for placement at a top of said windshield of said automobile, said front member further comprising a right end and a left end corresponding to said right side and said left side, respectively, of said automobile;
   an elongated right member shaped for placement at said right side of said automobile, said right member defined by a proximal end and a distal end, said proximal end of said right member affixed to said right end of said front member such that said right member is substantially perpendicular to said front member;
   an elongated left member shaped for placement at or near said left side of said automobile, said left member defined by a proximal end and a distal end, said proximal end of said left member perpendicularly affixed to said left end of said front member such that said left member is substantially perpendicular to said front member; and
   a flexible front panel having two configurations, wherein in a first configuration said front panel is condensed and fits inside and directly under said front member such that said front panel is unexposed, and further wherein in a second configuration said front panel is extended to cover at least a portion of said windshield;
   wherein said left member, said front member, and said right member form a continuous line at the top of a respective left window, windshield, and right window on said car.

2. The sun shade of claim 1, further comprising:
   a flexible right side panel extendable from said right member to cover one or more windows on said right side of said automobile; and
   a flexible left side panel extendable from said left member to cover one or more windows on said left side of said automobile.

3. The sun shade of claim 1, wherein said front panel is automatically extendable from said front member using a remote.

4. The sun shade of claim 1, wherein said front panel is comprised of a driver side panel and passenger side panel that can individually be retracted to cover a driver side portion and a passenger side portion, respectively, of said windshield.

5. The sun shade of claim 4, wherein:
   said front panel is representative of an appearance of lenses of a pair of sunglasses; and
   said front member, said left member, and said right member are U-shaped and continuous such that said front member forms a substantially perpendicular junction with each of said left member, right member, and said front member, and said front member is a single elongated member extending between and attaching to said left member and said right member collectively representative of an appearance of frames of sunglasses.

6. The sun shade of claim 1, wherein said right member and said left member are mountable to a right and a left window channel, respectively, such that said sun shade is detachably secured to said automobile, wherein said right and said left window channels comprise rubber or plastic grooves providing a fluid-tight seal between parts of said rubber or said plastic and said window which are in contact with each other.

7. The sun shade of claim 1, wherein said front member comprises a pulley and cord for extending and retracting said front panel.

8. The sun shade of claim 1, wherein said sun shade is anchorable to an interior of said automobile.

9. The sun shade of claim 1, further comprising:
a temperature sensor configured to automatically toggle said flexible front panel between said first configuration and said second configuration such that said second configuration is initialized upon detection of a threshold temperature by said temperature sensor.

10. A method of using the sun shade of claim 1, comprising the steps of:
mounting said sun shade to said automobile such that said front member is placed at a top portion of said windshield, and said right member and said left member are placed along said right side and said left side, respectively, of said automobile;
extending said front panel from said front member to cover said windshield; and
retracting said front panel into said front member to uncover said windshield.

11. A system of shades with panels for an automobile, comprising:
a front shade having an extendable and retractable front panel, said front member mounted to a front portion of an automobile such that said front panel in an extended condition covers at least a portion of a windshield of said automobile and in a retracted condition is hidden under said front panel;
a right shade having an extendable and retractable right panel, said right member mounted to a passenger side of said automobile such that said right panel in an extended condition covers at least a portion of at least one passenger side window of said automobile and in a retracted condition is hidden under said side panel; and
a left shade having an extendable and retractable left panel, said left member mounted to a driver side of said automobile such that said left panel in an extended condition covers at least a portion of at least one driver side window of said automobile and in a retracted condition is hidden under said side panel.

12. The system of claim 11, further comprising:
a wireless remote for toggling extension and retraction of said panels of said shades.

13. The system of claim 11, wherein each of said shades is extended and retracted manually by a user.

14. The system of claim 11, wherein said right shade and said left shade each comprise a lip adapted to be received into a window channel of a window of said automobile.

15. The system of claim 14, wherein said lips of said right shade and said left shade comprise an adhesive for securing said lips into said window channels of said automobile.

16. A sun shade for an automobile, comprising:
a continuous U-shaped frame formed of a front member and two side members, the front member placed at a juncture of a windshield and a roof of said automobile; and
two substantially similar panels retractably hanging from said front member such that said panels cover portions of said windshield, wherein in a fully retracted position, said panels are completely under said front member.

17. The sun shade of claim 16, wherein said frame and said panels collectively are representative of sunglasses with two sides and a front which are attached in a continuous structure and wearable by said automobile for preventing sunlight from entering the windshield.

18. The sun shade of claim 16, wherein said panels comprise two configurations, wherein a first configuration comprises said panels compacted into said front member, and further wherein in a second configuration comprises said panels hanging from said front member, under a force of gravity, to cover at least a portion of said windshield.

19. The sun shade of claim 18, further comprising:
a pulley disposed in said front member; and
a cord in translational communication with said pulley and said panels such that rotation of said pulley toggles between said two configurations of said panels.

20. The sun shade of claim 18, wherein said panels are affixed to a rotatable tube in the front member such that rotation of said tube causes said panels to be spooled around said tube thereby toggling said panels from said first configuration to said second configuration.

* * * * *